E. BARNARD.
MIRROR HOLDER.
APPLICATION FILED APR. 26, 1919.
1,327,608.
Patented Jan. 13, 1920.
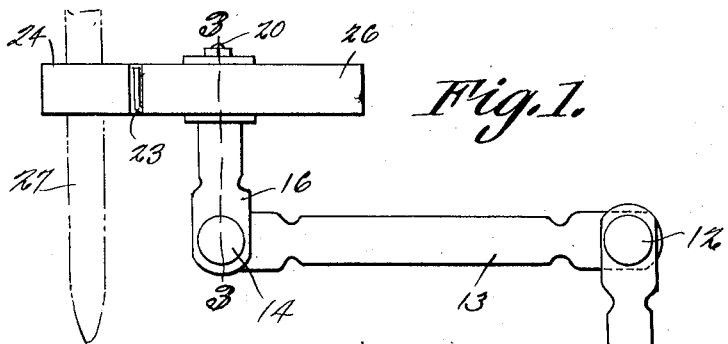
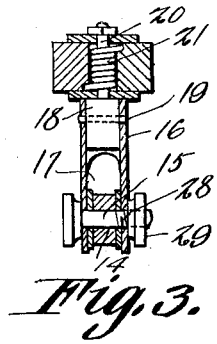
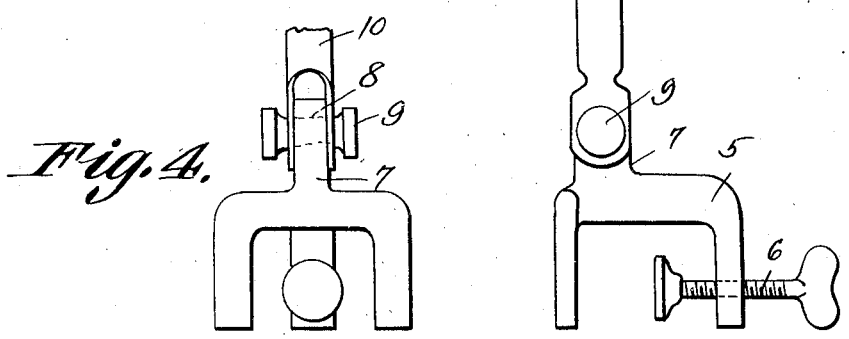
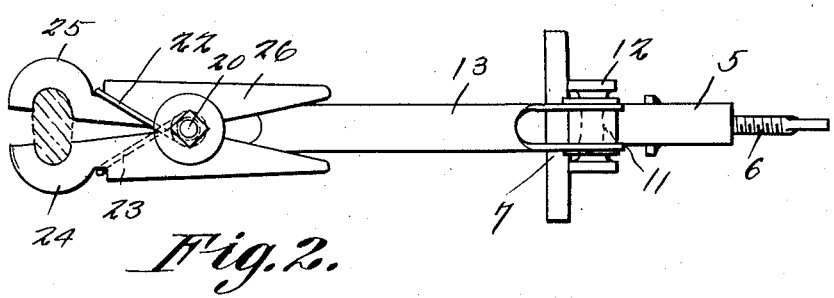
Inventor,
Elmer Barnard,
By
Attorney

UNITED STATES PATENT OFFICE.

ELMER BARNARD, OF CLEBURNE, TEXAS.

MIRROR-HOLDER.

1,327,608.  Specification of Letters Patent.  Patented Jan. 13, 1920.

Application filed April 26, 1919. Serial No. 292,847.

*To all whom it may concern:*

Be it known that I, ELMER BARNARD, a citizen of the United States of America, and resident of Cleburne, in the county of Johnson and State of Texas, have invented certain new and useful Improvements in Mirror-Holders, of which the following is a specification.

This invention relates to mirror holders and particularly to a bracket designed to be attached to and removed from chairs, bedsteads, tables or other articles of furniture, the said device being intended to hold a hand mirror in adjustable positions with relation to the article of furniture to which it is clamped so that the mirror can be positioned to reflect in connection with another mirror such as installed in bureaus, chiffoniers, or the like, and give the user a back view so desirable in arranging the hair or in fitting clothing.

An object of this invention is to provide novel means whereby the mirror may be held at different positions of adjustment and whereby the handle of the mirror may be clamped and held by the mirror upstanding or depending, according to the requirements in practice and it is possible by this invention to have the bracket on some article of furniture so that it will not have to be removed for, by reason of the fact that the mirror is removable from the bracket, the mirror can be used as a hand mirror and then replaced in the bracket or the clamp thereof when desired.

A still further object of this invention is to produce a bracket of the character indicated which is adjustable for height or laterally, thus making it adapted to a great number of uses.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of the bracket with a handle of a mirror in dotted lines;

Fig. 2 illustrates a plan view thereof;

Fig. 3 illustrates a sectional view on the line 3—3 of Fig. 1; and

Fig. 4 illustrates a front view of the clamp.

In these drawings 5 denotes a clamp with a screw 6 by which the clamp can be applied to the back of a chair or other article of furniture, the said clamp having a lug 7 with an aperture 8 therein for the reception of the pivot 9, on which an arm 10 is pivoted, the said arm having at its outer end an aperture 11 for the reception of a pivot 12 on which a second arm 13 is pivoted. The arm 13 has an aperture 14 for the pivot 15 and the said pivot 15 carries the short arm 16.

The arms are preferably made of tubular material and each is cut away at its ends to produce the bifurcations as shown at 17 in Fig. 3, so that the arms may have clearance to permit one to swing with relation to the other.

A post 18 is secured in the short arm 16 by a pin 19 and the said post terminates in a pintle 20 extending beyond the short arm 16 and constituting an anchorage for a spring 21. The spring is coiled around the pintle and has arms 22 and 23 which partially embrace the jaws 24 and 25 respectively of a clip 26, the said jaws being intended to embrace and clamp a handle 27 of a mirror (not shown).

It will be understood from an inspection of the drawing that when the handles of the clamping jaws are pressed together the jaws will be separated and when said handles are released the arms of the spring will operate to press the jaws into engagement with the handle of the mirror.

By reason of the presence of the pivots 9, 12 and 15, the arms may extend straight upwardly from the clamp or straight downwardly or the arms may be adjusted to the angular positions shown in Fig. 1 or at angles intermediate the angles there shown.

Fig. 3 shows that the pivot 15 has a threaded section 28 engaged by a binding nut 29 and by adjusting this binding nut, sufficient friction can be produced to hold the arms at different positions of adjustment and it is the purpose of the inventor to have each pivot made in accordance with the construction shown in Fig. 3 so that the function of the binding nut will be present at each of the joints of the arms.

I claim:

In a mirror holder, a clamp, an arm pivotally connected to the clamp, means for holding the arm at different positions of adjustment with respect to the clamp, an arm pivotally connected to the first mentioned arm, means for holding the said arms at different positions of adjustment with relation to each other, a hollow arm pivotally connected to the second mentioned arm, means for holding the said arms in different positions of adjustment, a post in the outer end of the last mentioned arm, the said post terminating in a pintle projecting beyond the end of said arm, means for holding the post in the arm, a spring encircling the pintle, and having ends extending therefrom, clamping members each having a side fulcrumed on the spring, the extensions of the spring each extending along the side of one of the clamping members and embracing its edge, the said clamping members terminating in jaws to embrace and frictionally support the handle of a mirror.

ELMER BARNARD.